US006557391B2

United States Patent
Lüchinger

(10) Patent No.: US 6,557,391 B2
(45) Date of Patent: May 6, 2003

(54) BALANCE WITH A WEIGHING-LOAD CARRIER AND A CALIBRATION DEVICE

(75) Inventor: Paul Lüchinger, Uster (CH)

(73) Assignee: Mettler-Toledo GmbH, Greifensee (CH)

(*) Notice: Subject to any disclaimer, the term of this patent is extended or adjusted under 35 U.S.C. 154(b) by 24 days.

(21) Appl. No.: 09/957,977

(22) Filed: Sep. 21, 2001

(65) Prior Publication Data

US 2002/0038567 A1 Apr. 4, 2002

(30) Foreign Application Priority Data

Oct. 4, 2000 (CH) ..................................... 2000 1957/00

(51) Int. Cl.[7] .............................................. G01G 23/01
(52) U.S. Cl. ......................................... 73/1.13; 177/50
(58) Field of Search ............................. 73/1.13; 177/50, 177/246

(56) References Cited

U.S. PATENT DOCUMENTS

| 4,425,975 A | | 1/1984 | Lüchinger .................... 177/50 |
| 4,566,548 A | | 1/1986 | Södler et al. ............... 177/229 |
| 4,611,675 A | * | 9/1986 | Yomonoka ...................... 177/1 |
| 4,682,664 A | * | 7/1987 | Kemp ...................... 73/1.13 X |
| 4,766,965 A | * | 8/1988 | Lüchinger ................ 73/1.13 X |
| 4,932,487 A | | 6/1990 | Melcher et al. ............... 177/50 |
| 5,148,881 A | | 9/1992 | Leisinger ..................... 177/50 |
| 5,886,854 A | * | 3/1999 | Emery et al. ................. 177/50 |
| 2002/0040814 A1 | * | 4/2002 | Lüchinger et al. .......... 177/180 |

FOREIGN PATENT DOCUMENTS

JP 62-266421 * 11/1987 .................. 177/58

* cited by examiner

Primary Examiner—Thomas P. Noland
(74) Attorney, Agent, or Firm—Friedrich Kueffner

(57) ABSTRACT

A balance (1) has a weighing compartment (3) and a balance housing (4). The balance housing (4) contains a weighing cell (15) and forms a rear wall (13) and a floor (8) for the weighing compartment (3). A weighing-load carrier (2) is arranged on a cantilever arm (30) of the weighing cell (15). The cantilever arm (30) also holds a weight-receiving element (6) for calibration weights (7) of a calibration device (5). The weighing-load carrier (2) is releasably attached to a coupling arrangement (11) protruding from the cantilever arm (30) through passage openings (12) in the rear wall (13). The floor (8) extends without openings between the weight-receiving element (6) for the calibration weights (7) and the weighing-load carrier (2).

24 Claims, 10 Drawing Sheets

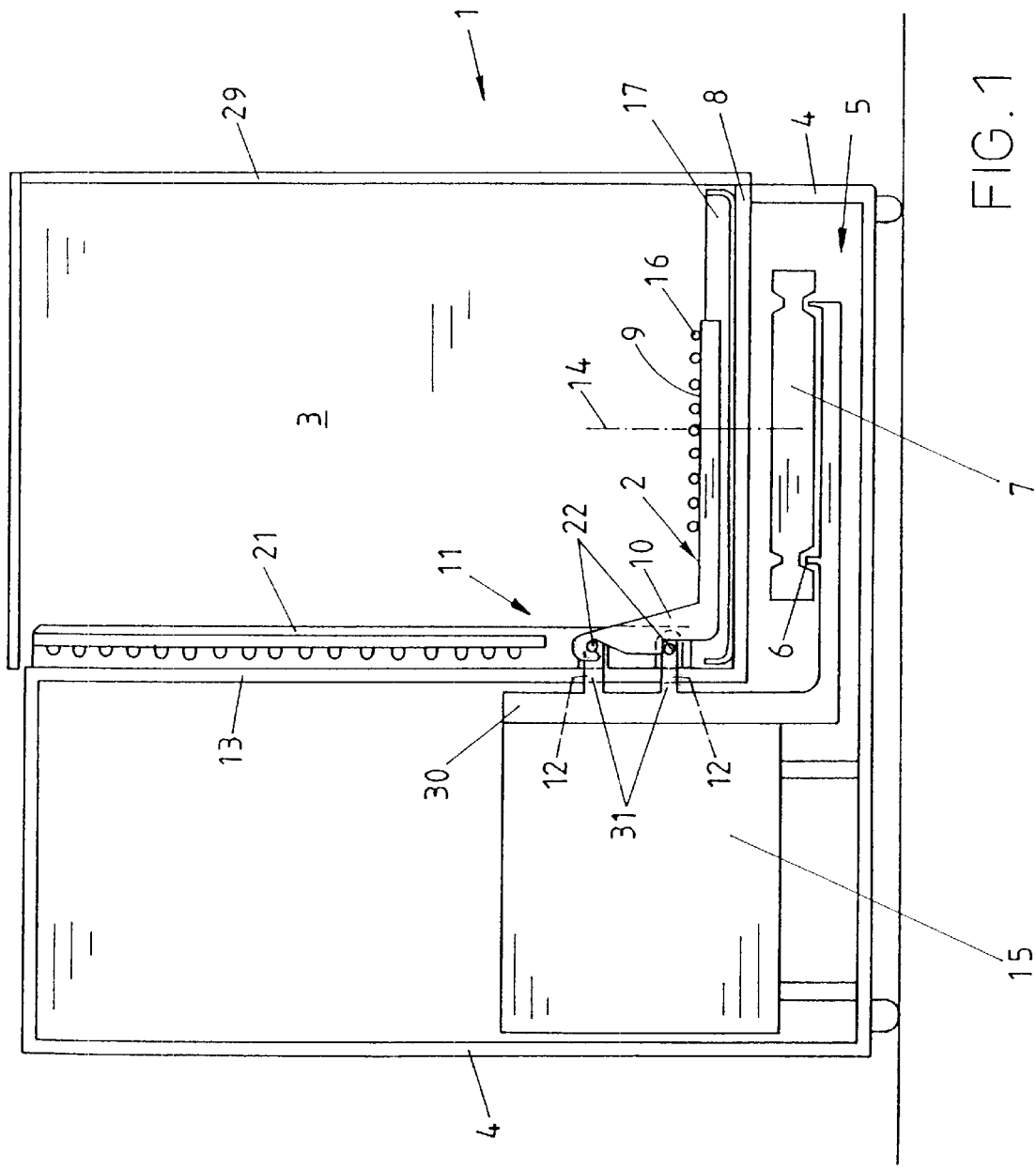

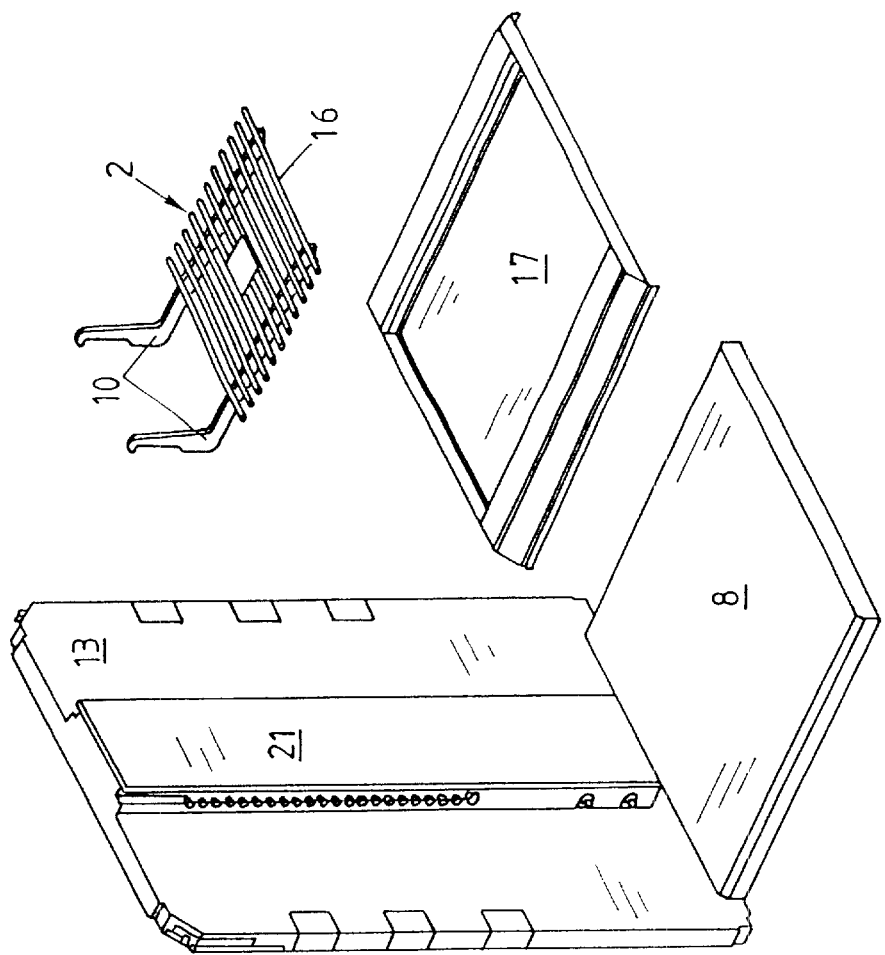
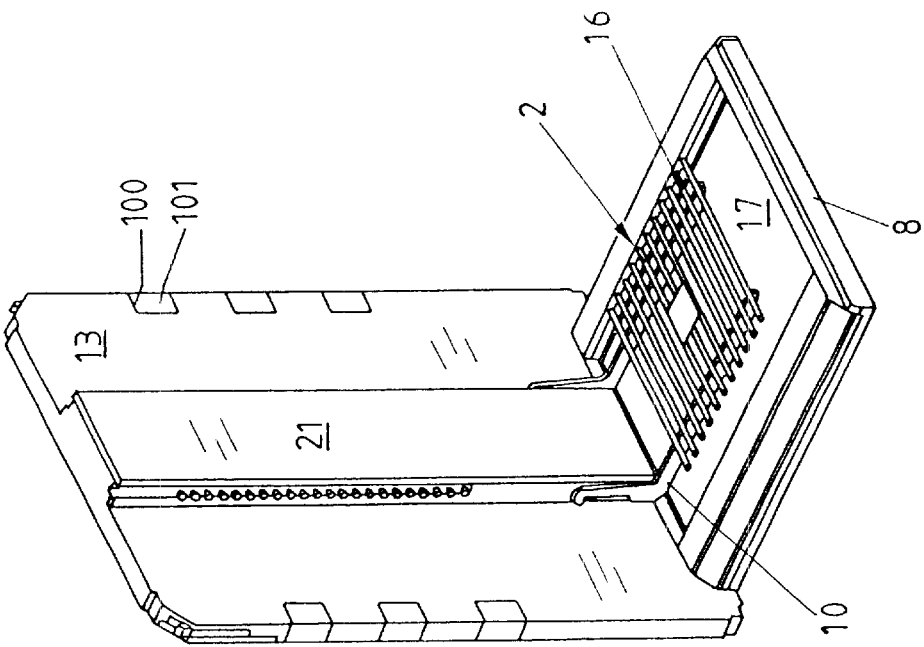

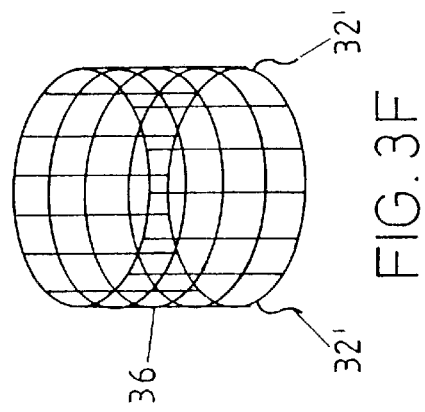
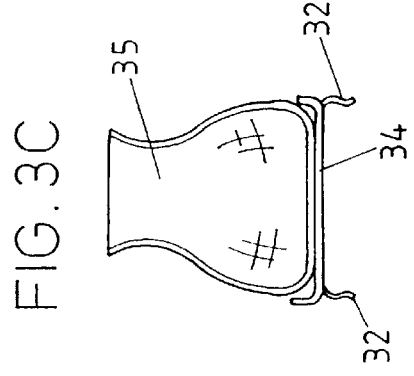
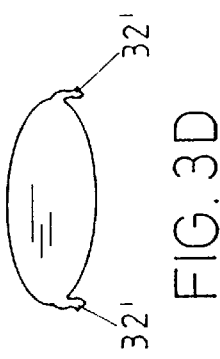
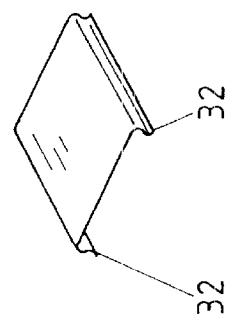
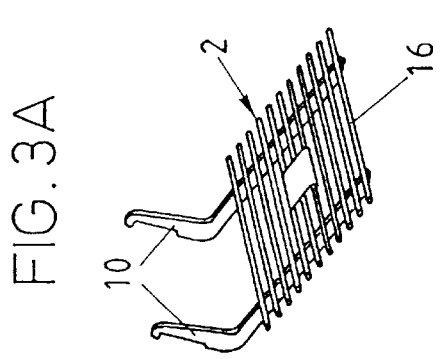
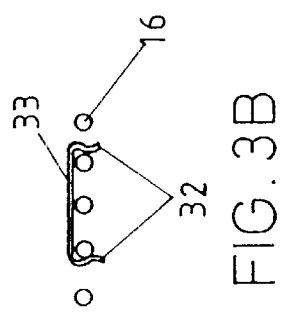

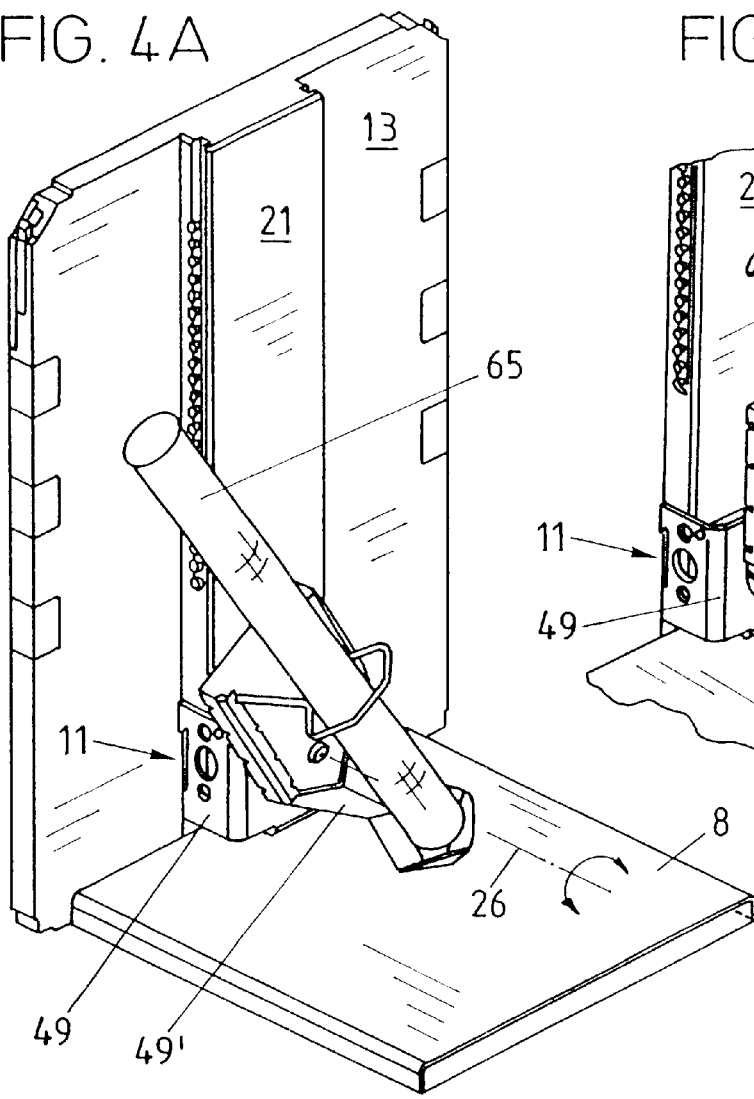
FIG. 4A
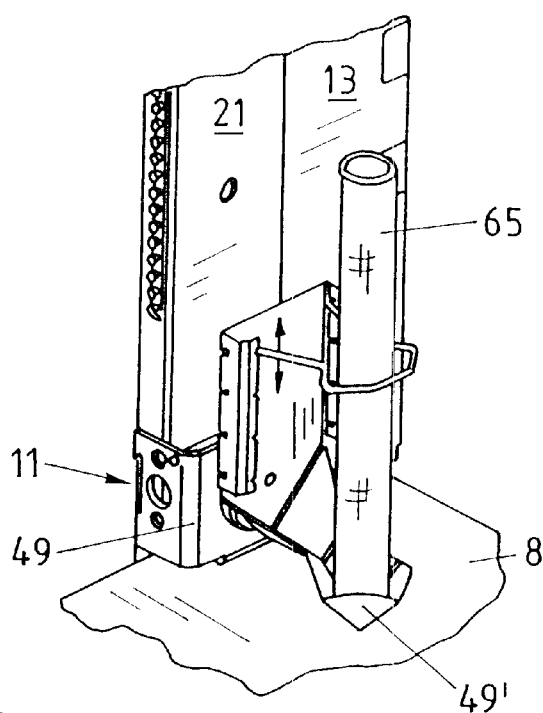
FIG. 4B
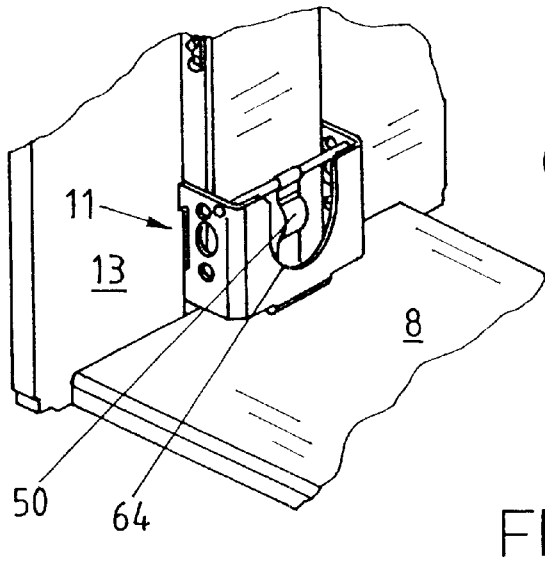
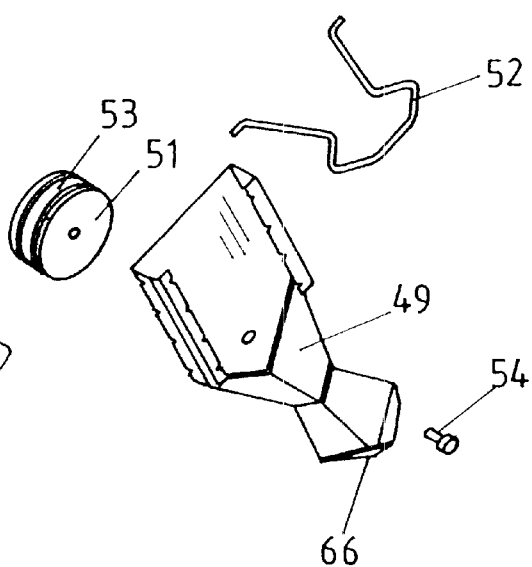
FIG. 4C

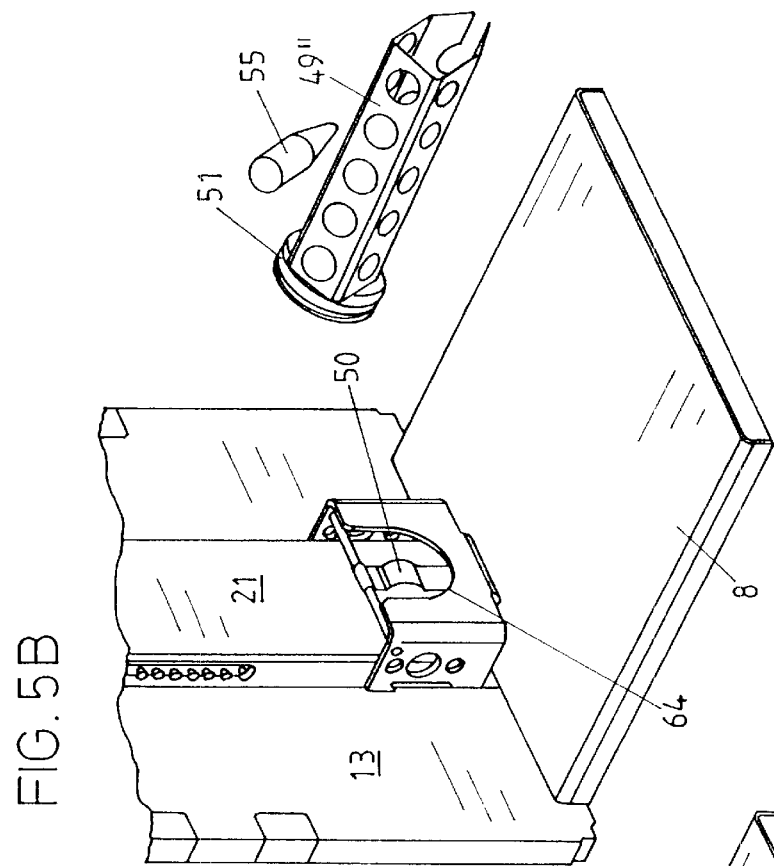
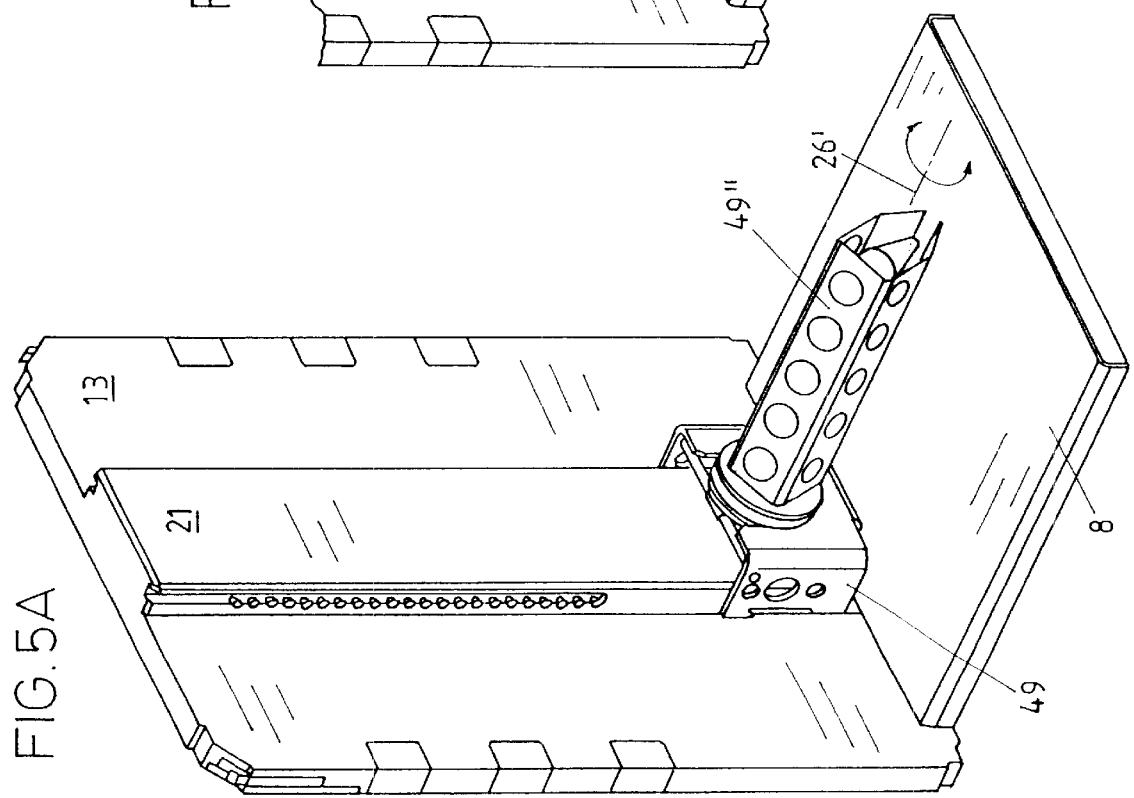

BALANCE WITH A WEIGHING-LOAD CARRIER AND A CALIBRATION DEVICE

BACKGROUND OF THE INVENTION

The present invention relates to a balance with a weighing compartment, a balance housing, a carrier for the weighing load, and a calibration device with a receiving element for the calibration weights.

Balances of this type serve mainly as analytical balances and are used widely in laboratories.

A balance meeting the foregoing description is disclosed in U.S. Pat. No. 4,766,965. The weighing pan is supported by a cantilever arm that is attached to and projects forward from the bottom end of the load receiver of the weighing cell. The weighing pan is arranged immediately above the floor of the weighing compartment and is connected to the cantilever arm through an opening in the floor. A calibration device with a mechanism for raising and lowering the reference weights is arranged below the floor of the weighing compartment.

In U.S. Pat. No. 4,566,548, a balance is described with an L-shaped cantilever arm extending below the floor of the weighing compartment, where the balance pan is supported on the horizontal leg of the L. The support connection passes through an opening in the floor of the weighing compartment. The vertical leg of the L of the cantilever arm is attached by way of a U-shaped holder to the movable end of the parallelogram linkage of the weighing cell. Two cylindrical reference weights are arranged immediately below the floor of the weighing compartment and are secured in a fixed position by a weight-lifter mechanism. To calibrate the balance, one or the other or both of the weights are selectively lowered onto a weight-receiving element on the cantilever arm.

A further balance in the same general category is described in JP 62-266421, disclosing a concept where the weighing pan as well as a cantilever arm supporting the weighing pan are arranged above the floor of the weighing compartment. The support arm for the weighing pan is connected to the inner working mechanism of the balance through a passage opening in the rear wall of the weighing compartment.

All of the aforementioned known balances suffer from the drawback that they have relatively large passage openings through the floor or the rear wall of the weighing compartment, so that contaminants can easily get inside the balance housing.

OBJECT OF THE INVENTION

It is therefore the object of the present invention to propose a balance that is or can be equipped with a user-operated calibration device, that has a compact design, is less susceptible to contamination, and can be used in a multitude of applications.

SUMMARY OF THE INVENTION

According to the invention, the foregoing objective is realized in a balance with a balance housing that contains a weighing cell and forms the rear wall and the floor of a weighing compartment. The balance has a weighing-load carrier held by a cantilever arm of the weighing cell. Connected to the cantilever arm are a receiving element for the weights of a calibration device and a coupling arrangement for the weighing-load carrier that projects through openings in the rear wall. The coupling arrangement is designed so that the weighing-load carrier can be taken off the balance. The floor of the weighing compartment completely separates the weighing-load carrier from the receiving element for the calibration weights.

The balance according to the invention is distinguished by its compact design. The inventive configuration represents, in effect, a dual-cantilever system with one cantilever arm supporting the receiving element for the calibration weights and the other cantilever arm being constituted by the weighing-load carrier. The openings required for the coupling arrangement of the weighing-load carrier are small in comparison to the passages performing an analogous function in state-of-the-art balances. A balance designed according to the present invention is therefore drastically less susceptible to dirt contamination. The inventive arrangement offers a multitude of application possibilities, as will be described below through examples, and it also optimizes the operation of the balance from an ergonomics point of view.

Preferably, the center of the weighing-load carrier is located vertically above the center of gravity of the calibration device.

The weighing-load carrier in a preferred embodiment of the invention is configured as a plane horizontal grate. This has many possible applications for weighing in a laboratory. For example, receptacles or devices of the most diverse kinds can be set on the grate and/or clamped to the grate. Spilled sample material does not stay on the weighing-load carrier but drops off between the bars of the grate, so that the spilled material cannot inadvertently be included in a weighing. In a particularly favorable design, the bars of the grate have a roof-like triangular profile with a ridge at the top, which ensures even better that spilled sample material will drop off the grate. Using a grate as weighing-load receiver has also particular advantages for fastening different kinds of holders for sample containers.

According to a further preferred embodiment of the invention, the weighing-load carrier itself is configured as a holder for one or more laboratory vessels. The holder may also be arranged so that it can be tilted at different angles.

To facilitate cleaning of the weighing compartment, it is advantageous to arrange a fixed or removable spill-collector plate on the floor of the weighing compartment to catch spilled weighing sample material.

In an advantageous further development of the invention, the inside rear wall of the weighing compartment is equipped with a holder system for accessory devices that can be used inside the weighing compartment. This provides the flexibility of using the balance for different kinds of applications and/or experiments that can be performed inside the weighing compartment.

In a preferred embodiment of the invention, the holder system is configured as a portion of the rear wall that projects into the weighing compartment like a column and has grooves in the laterally facing flanks. The openings for the coupling arrangement of the weighing-load carrier can be to the sides of the holder arrangement or they can be in the flanks of the column, aligned with the grooves.

A preferred embodiment of the invention has a load-relief mechanism to lift the load off the weighing-load carrier. The load-relief mechanism is arranged at the rear wall and has a lift platform shaped like a grid of bars or spaced-apart lamellae. When the lift platform is raised, the bars or lamellae of the lift platform come up through the gaps between the bars of the weighing-load carrier and lift the weighing object off the carrier grate. With the load-relief mechanism, it is not necessary to remove and subsequently return the weighing load when re-zeroing the balance. Thus, a potential source of weighing errors is avoided. It is also possible to perform long-term weight studies and recalibrate the balance between the individual weighings.

To facilitate cleaning of the balance, the lift platform is designed to be easily disassembled. Preferably, the load-relief mechanism is motorized.

Other advantageous embodiments of the balance according to the invention provide the possibility of integrating code-identification systems or set-ups for experiments into the balance, e.g., for turbidity measurements, to make certain work processes more efficient.

Advantageous traits of a balance according to the invention are its compact design and its modular configuration that make it remarkably versatile for a variety of laboratory applications. The inventive balance is distinguished by its flexibility and by how quickly it can be reconfigured for different applications. In addition, cleaning the separate components is very easy.

BRIEF DESCRIPTION OF THE DRAWINGS

Further details of the invention may be learned from the following description of embodiments that are schematically illustrated in the drawings, wherein FIG. 1 represents a side view of the balance;

FIGS. 2A and 2B represent a perspective, three-dimensional view of the weighing compartment without the balance housing and draft shield enclosure;

FIGS. 3A to 3F represent different clip-on devices that can be attached to the grate of the weighing-load carrier;

FIGS. 4A to 4C represent a weighing load carrier according to a different embodiment of the invention;

FIGS. 5A and 5B represent a weighing load carrier according to yet another embodiment of the invention;

DETAILED DESCRIPTION OF PREFERRED EMBODIMENTS

Figure 6A:
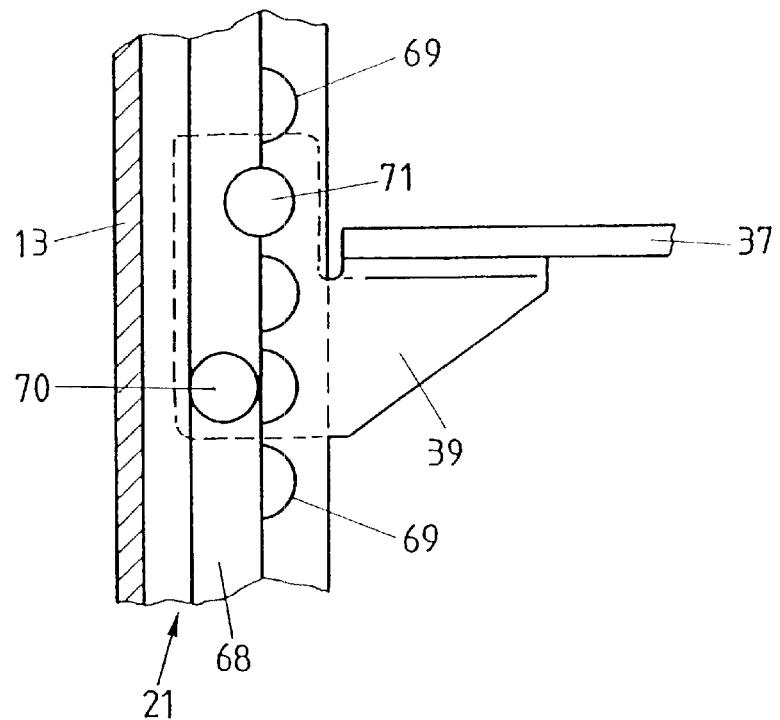
FIGS. 6A and 6B represent a side view and a top view, respectively, of a concept for different height settings on the holder system.

FIG. 1 shows a side view of the balance 1 with a balance housing 4 and a draft shield 29 enclosing the weighing compartment 3. The left-hand portion of the balance housing 4 contains the weighing cell 15, which is not illustrated in detail. An L-shaped cantilever 30 with a calibration device 5 is connected to the load-receiving portion of the weighing cell 15 to introduce the weight force into the weighing cell. The horizontal portion of the L-shaped cantilever 30 has a weight-receiving element 6 for the calibration weights 7. The calibration device 5 is arranged in a portion of the balance housing 4 that is closed off by the floor 8 against the weighing compartment 3. The vertical portion of the L-shaped cantilever 30 has projections 31 extending towards the weighing compartment and standing out through the passage openings 12 of the rear wall 13 of the weighing compartment 3. The projections 31 with coupler bolts 22 form a coupling arrangement 11. The weighing-load carrier 2 has hook-on portions 10 that are seated on the coupler bolts 22, so that the weighing load carrier 2 can easily be detached from the coupler bolts 22. The weighing-load carrier 2 serves as a platform for a variety of clip-on devices used in different applications, for example bowls, laboratory vessels, other containers for weighing samples, or for the weighing samples themselves. In the example of FIG. 1, the weighing-load carrier is configured as a level grate 16. A grate also reduces the potential for weighing errors due to air drafts, because the grate offers a smaller effective surface to air currents than a weighing platform with a solid surface.

A weighing object should preferably be centered on the weighing-load carrier 2. The mass center of gravity of the calibration weights 7 should therefore be located on the vertical axis 14 through the center of gravity of the surface area 9 of the weighing-load carrier 2. Given that the balance 1 according to the invention does not require an opening in the floor 8 for movable parts of the balance mechanism, a spill-collector plate 17 is arranged to completely cover the floor 8 below the weighing-load carrier 2. Spilled sample material will thus drop to the spill-collector plate 17, so that it cannot inadvertently be included in a weighing. To keep spilled materials as much as possible from accumulating on the weighing-load carrier, it is particularly advantageous if the bars of the grate are of a roof-like triangular profile with a ridge at the top. An additional advantage of the inventive balance of FIG. 1 is that it is easy to clean.

Also in FIG. 1, a holder system 21 is shown, which is located at the rear wall above the place where the hook-on portions 10 of the weighing-load carrier 2 are hooked onto the bolts 22 on the projections 31. The holder system 21 offers a variety of user conveniences and applications that will be described below in more detail.

FIG. 2A gives a perspective view of the weighing compartment 3 without the draft shield 29. The only parts of the balance housing 4 that are shown are the rear wall 13 of the weighing compartment 4 and the parts that make up the floor 8 of the weighing compartment. The weighing-load carrier 2 is shown in the installed condition in FIG. 2A, and the spill-collector plate 17 is in place. FIG. 2B gives an analogous view with the weighing-load carrier 2 detached and the spill-collector plate taken out.

FIGS. 3A to 3F illustrate a variety of clip-on attachments for different applications, which can be used together with the grate 16 of the weighing-load carrier 2. FIG. 3A shows the weighing-load carrier 2 with the grate 16. FIG. 3B shows a sample-carrier plate 33 with bent-over border portions 32 as a possible means of attachment. Also conceivable are dish-shaped attachments 34 for laboratory vessels 35 as shown in FIG. 3C, or round attachments as shown in FIG. 3D, or rectangular sample-carrier plates as shown in FIG. 3E. The round wire structure of FIG. 3F serves as a Faraday cage 36 to counteract the build-up of electrostatic charges. A preferred form of attachment is my means of bent-over borders 32, as described above, or by means of bent-over ears 32' as shown in FIG. 3D.

The weighing-load carrier of FIGS. 4A to 4C consists of a hook-on adapter 49 and a holder 49'. FIG. 4A gives a perspective view into the weighing compartment without draft shield 29. The hook-on adapter 49 is attached to the coupling arrangement 11. The holder 49' is in a tilted position in relation to a tilt axis 26 that is perpendicular to the rear wall 13. FIG. 4B represents a detail of FIG. 4A, illustrating the hook-on adapter 49 with the holder 49' in a vertical orientation. FIG. 4C shows the holder 49' detached from the hook-on adapter 49' and disassembled. The hook-on adapter is put in place on the coupling arrangement 11 in a similar way as the weighing-load carrier 2 in FIG. 1. The hook-on adapter 49 has a substantially semi-circular cutout 64 with a spring 50 behind it. The arrangement of the semi-circular cutout and spring serves to receive a circular disk 51 with a groove 53 around its border, so that it can be rotated in the cutout 64 but is held in any set position by the spring 50. Attached to the disk 51 by means of a screw 54 is the holder 49'. The tiltable holder 49' has a cup-shaped bottom portion 66 and serves, e.g., to hold test tubes 65 that are held in position by a height-adjustable bracket 52. The fact that the holder 49' can be tilted makes it easier to dispense substances into the test tube 65 for weighing.

FIG. 5A illustrates a holder 49" that is seated in the hook-on adapter 49. The holder 49" serves to hold a plurality of small vessels 55 of a narrow neck diameter, e.g., centrifuge containers. The holder 49" can be tilted about an axis 26' and is seated in the hook-on adapter 49 in the same manner as the holder 49'. Because material is easily spilled when powdery substances are dispensed into the narrow-necked containers 55 with a spatula, it is advantageous to bring the containers 55 into a strongly tilted position for dispensing substances into them. This includes the dispensing of fluids, e.g., by means of a multi-channel pipette.

With the balance 1 according to the invention, a multitude of advantageous arrangements are possible in the weighing compartment 3, due to a holder system 21 on the rear wall 13 of the weighing compartment which allows accessory devices to be set up for example on shelves and holders that can be mounted at different heights from the floor 8.

Figure 6B:
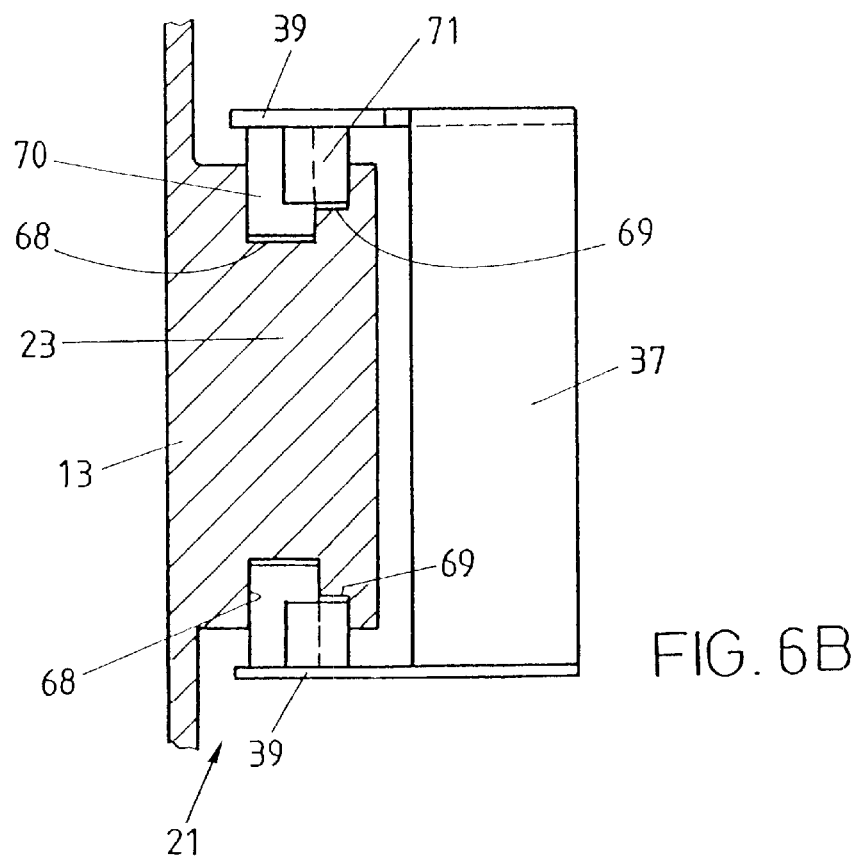

FIGS. 6A and 6B show, respectively, a side view and a cross-sectional view of one of many connector mechanisms for installing shelves 37 and/or equipment holders on the holder system 21. The holder system 21 has the shape of a vertical rail or column 23 on the rear wall 13. The column 23 has vertical grooves 68 on its lateral flanks. The coupling arrangement 11, where the weighing-load carrier 2 is attached, is located in the lower portion of the column 23, in alignment with the grooves 68 (see FIGS. 1, 2, 4 and 5). The sides of the grooves 68 that are closer to the front of the holder system 21 have semi-circular recesses 69 spaced at regular intervals, providing form-fitting seats for pegs 71 of the connector mechanism 39 for a shelf 37 or for an equipment holder. The pegs 71 are offset towards the rear in relation to the pegs 70 and stay in the grooves 68. By slightly lifting the shelf 37 or an equipment holder at the end facing the operator of the balance, the pegs 71 come out of the semi-circular recesses 69 as the shelf is tilted about an axis formed by the pegs 70. In the tilted position of the shelf or equipment holder, the pegs 70 and 71 can be moved up or down in the grooves 68 to a new position, where the pegs 71 are set into another pair of semi-circular recesses 69 by turning the shelf 37 or an equipment holder back to the horizontal position.

Figure 7:
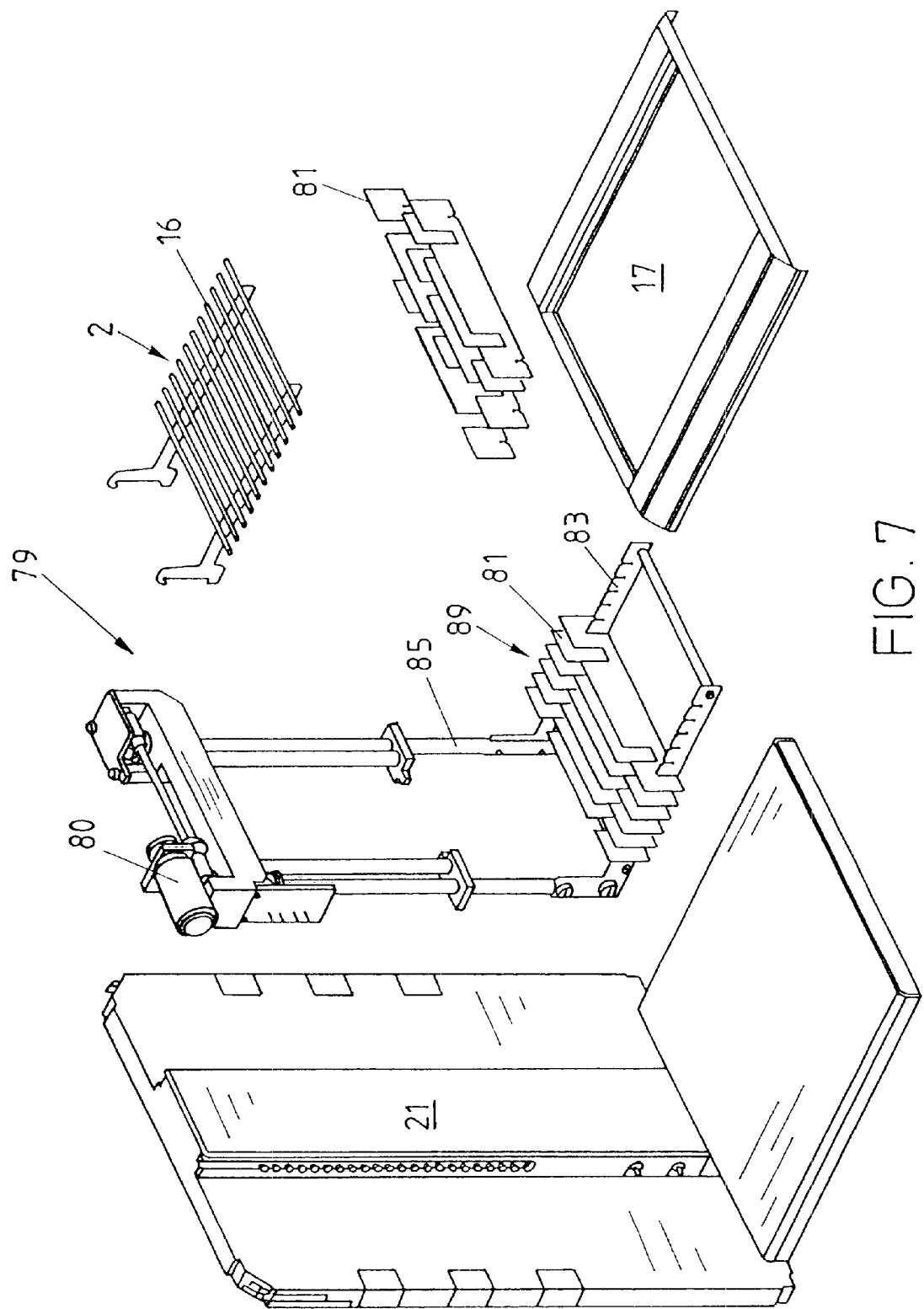
FIG. 7 represents a perspective view of a load-relief mechanism.

FIG. 7 gives a perspective view of a load-relief mechanism 79 that can be set into the holder system 21. The mechanism has an L-shaped frame 85 and a motor 80 for raising and lowering a lift platform 89 with two arms 83 and a grid of spaced-apart lamellar elements 81. When the lift platform is raised, the lamellar elements 81 come up through the gaps between the bars of the grate 16 of the weighing-load carrier 2.

Figure 8:
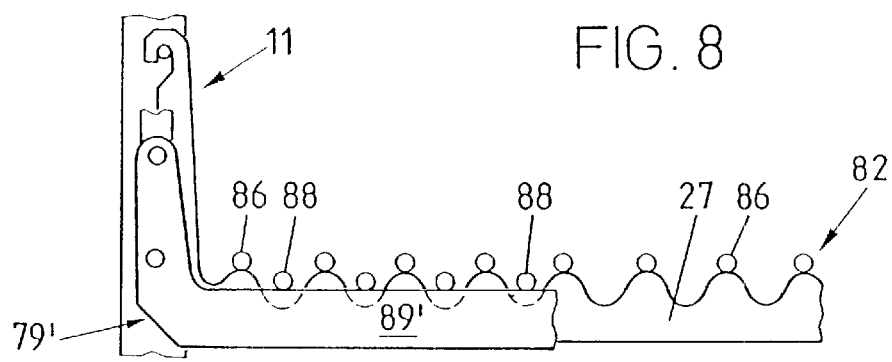
FIG. 8 represents a side view of a grid-shaped lift platform and the load carrier grate of the balance.

FIG. 8 shows a differently designed detail portion of a load relief system 79' in the area of the weighing-load carrier 82 and the lift platform 89'. The weighing-load carrier 82, which is connected to the coupler arrangement 11, has a design in which the two lateral support beams 27 of the grate have wave-shaped contours with the bars 86 of the grate attached to the tops of the waves. The bars 88 of the load-relief system 79' are arranged so that they lie between and normally below the bars 86, extending through the valleys of the wave contours. When the lift platform 89' is raised, the bars 88 of the lift platform 89' will come up through the gaps between the bars 86 of the weighing-load carrier 82 into a position above the plane of the bars 86.

Figure 9A:
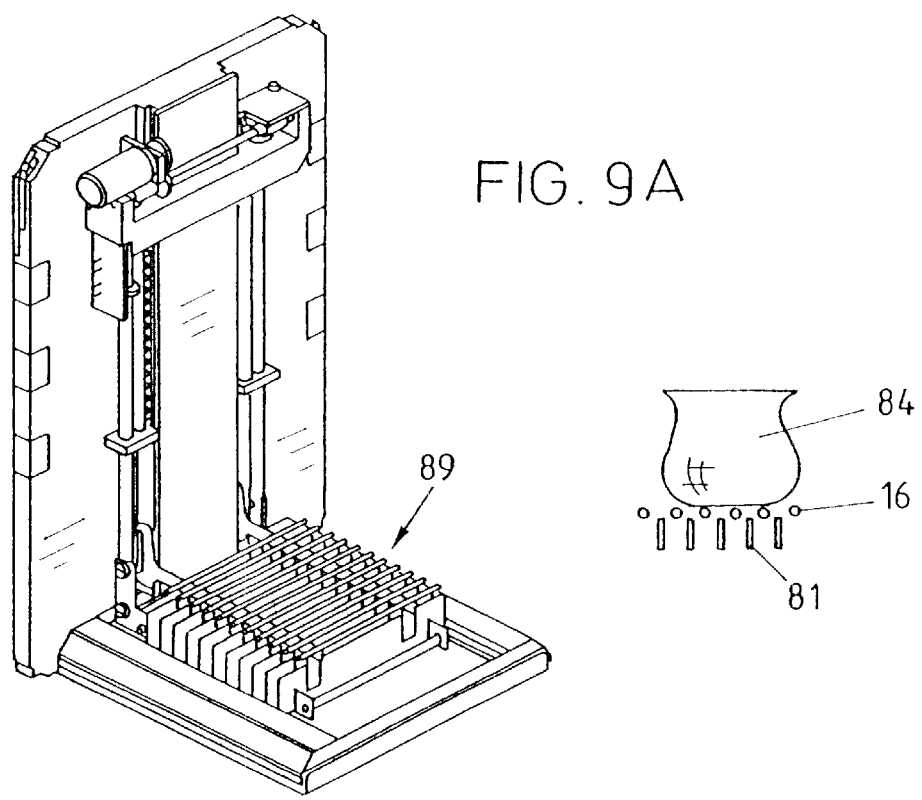
FIGS. 9A and 9B illustrate in a perspective view of how the load-relief mechanism works.
Figure 9B:
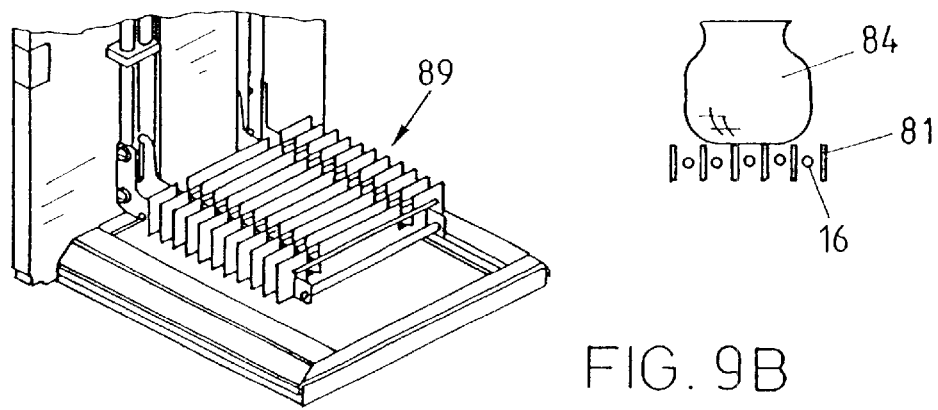

An example of how the load-relief system 79 works is illustrated in FIGS. 9A and 9B with the lamellar arrangement of the lift platform. FIG. 9A shows the load-relief system in the position for weighing, where the weighing container 84 rests on the grate 16 of the weighing-load carrier 2. The lamellae 81 of the lift platform grid are in the down position. In contrast, FIG. 9B shows the up position of the lift platform, where the weighing container 84 is lifted' off the grate 16 of the weighing-load carrier 2, resting instead on the raised lamellae 81 of the lift platform 89. The lamellar arrangement of the lift platform as well as the grate 16 of the weighing-load carrier 2 are easy to clean.

A useful application of the load-relief system is in long-term weight studies where it is necessary to re-zero the balance at prescribed time intervals and to take the weighing load off the weighing-load carrier for the re-zeroing. It is also conceivable to recalibrate the balance during a longterm application. Before the start of the calibration routine, the weighing container 84 is lifted off the grate 16 of the weighing-load carrier 2 by means of the load-relief system 79, 79'. Then the calibration weight 7 is placed on the weight-receiving element 6 of the calibration device 5 and weighed. After the new calibration data for the balance have been calculated and stored in memory, the weighing container 84 with the weighing sample is set back onto the weighing load carrier 2, 82 by lowering the load-relief device 79, 79', at which point the normal weighing operation of the balance can be resumed.

The load-relief system is further useful, when multiple weighings of the same weighing sample have to be made for statistical purposes, e.g., to determine a standard deviation. This normally requires that the weighing object be taken off the weighing pan between weighings in order to ascertain that the zero point of the balance has not drifted off. With the load-relief system, the weighing object does not have to be manually taken off and set back, so that the process of statistical weighings becomes more efficient and reliable.

The frame 85 of the load-relief system 79, 79' is configured in such a way, that even with the load-relief system 79, 79' installed, it is still possible to use the holder system 21 to fasten accessory devices, e.g., a shelf 37 or a holder at any desired height from the weighing compartment floor 8.

It is further conceivable to design the load-relief system 79, 79' so that it is flexible to be used in alternative applications. For example, by removing the lamellae 81 or the lift platform 89, 89' in a case where the balance does not need to be re-zeroed or recalibrated with a weighing load in place, the load-relief system 79, 79' could become usable for the motorized height adjustment of accessories that are fastened to the holder system 21, e.g., a shelf 37 or a holder. Instead of being attached directly to the holder system 21, the shelf 37 or a holder would be attached to the load-relief system 79, 79' which, in turn, is connected to the holder system 21. Alternatively, the holder system 21 itself can be designed to perform the function of raising and lowering an attached object.

Figure 10:
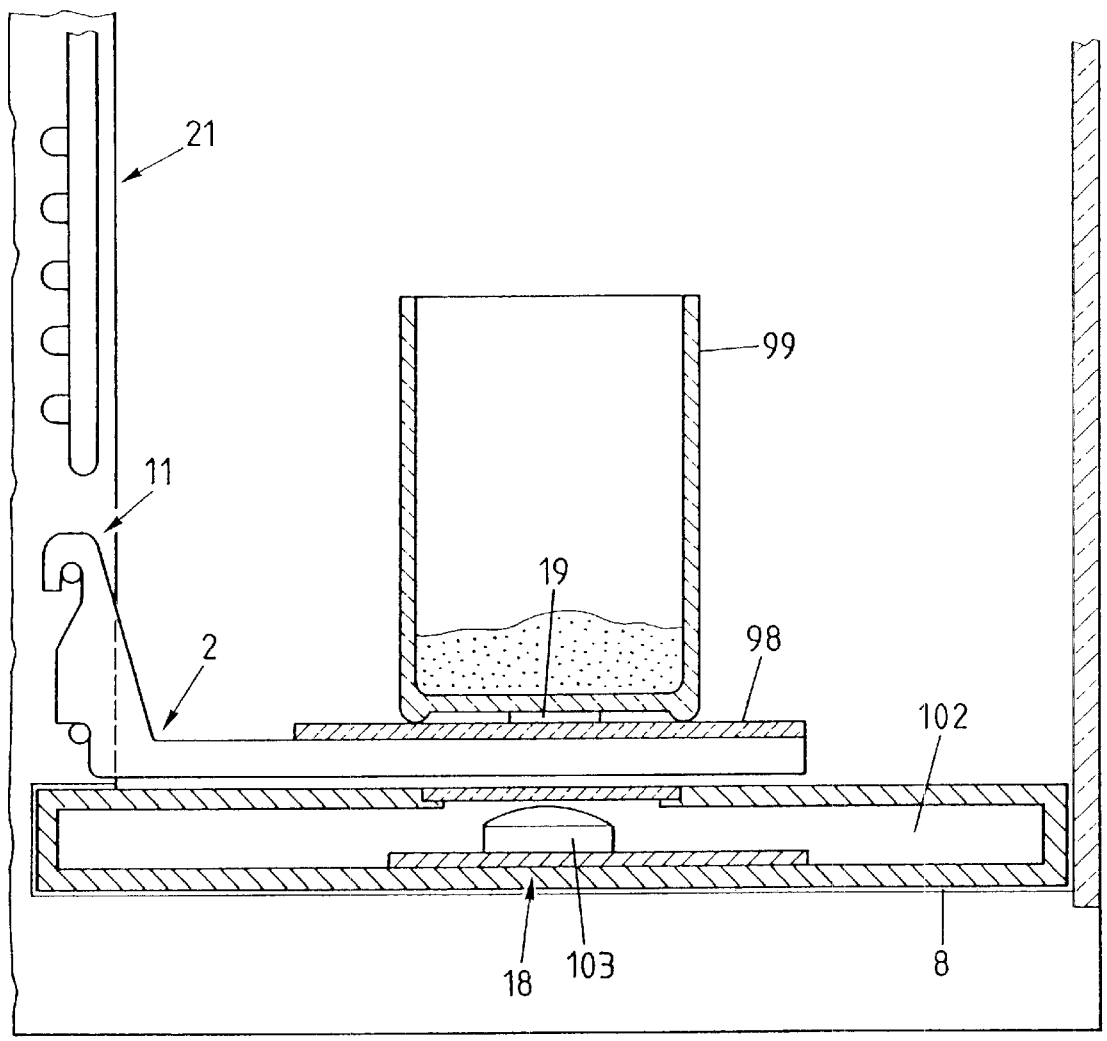
FIG. 10 represents a side view of an arrangement for a code reader system to identify weighing containers.

The arrangement where the weighing-load carrier 2 is connected to the weighing cell 15 through a coupler arrangement 11 at openings 12 in the rear wall 13 of the weighing compartment 3 opens up flexible design possibilities. As the floor 8 remains free for other uses, it is possible to install an optical or inductive code-reader device 18 in the floor 8 below the weighing-load carrier 2, e.g., to read an identification code 19 on the bottom of a weighing container 99. As can be seen in FIG. 10, the optical or inductive code-reader device 18 is installed in an insert module 102 placed on the floor 8 of the weighing compartment. Preferably, the emitter and receiver parts of the code-reader device 18 are contained in the same sensor housing 103. In the area of the identification code 19, the carrier platform 98 of the weighing-load carrier 2 is either transparent, e.g., made of glass (for an optical reader system) or non-inductive, e.g., made of a ceramic or polymer material (for an inductive reader system)

The code-reader device 18, whether it uses an optical or inductive sensor, can also be arranged to the side of the weighing-load carrier 2, with the identification code 19 being in this case located on the side wall of the container 99. In particular, the code reader device 18 can be designed to be attached to the holder system 21 at a selected height from the floor 8 of the weighing compartment.

Figure 11:
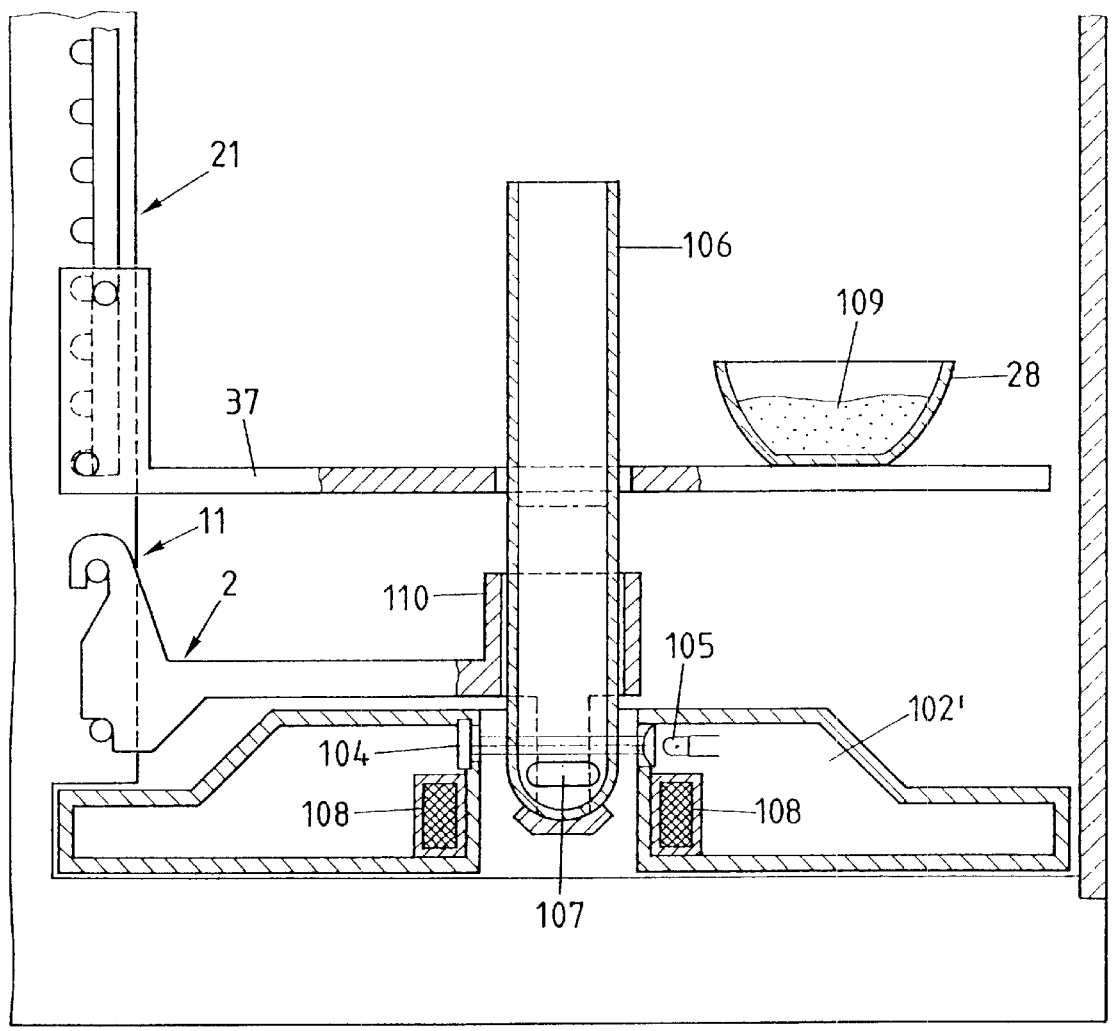
FIG. 11 represents a side view of a setup for turbidity measurements.

It is also possible to perform turbidity measurements in the weighing compartment 3 (see FIG. 11) by means of an insert module 102' placed on the floor 8 of the weighing compartment 3. The insert module 102' has a raised portion on top, containing a laser 104 as emitter and a photo-diode 105 as receiver. The turbidity is determined by measuring the amount of light transmitted through a transparent measuring container 106 with planar wall portions in the area of the light path. A stirrer can be placed on the bottom of the measuring container 106, such as the magnetic stirrer 107 shown in the drawing, which is driven by the alternating magnetic field of the magnets 108. The measuring container is held in place by the holder 110 that is connected to the weighing-load carrier 2. It is particularly advantageous that weight and turbidity can be measured in combination. In the experimental setup shown in FIG. 11, a shelf 37 with an opening for the measuring container 106 is attached to the holder system 21. From a glass container 28 on the shelf 37, a substance 109 is dispensed into the measuring container 106, which causes a change in the weight and turbidity of the liquid in the container 106. After the turbidity measurement has been completed, the weight of the liquid in the measuring container 106 can be determined after the magnetic stirrer has been shut off.

For experimental setups of all kinds that are installed in the weighing compartment, cables and hoses can be passed from the outside into the weighing compartment through openings 100 that can be closed with clip-on covers 101 as shown in FIG. 2A. Details are described in the parallel Swiss patent application CH-1958/00.

LIST OF REFERENCE SYMBOLS 1 balance
2 weighing-load carrier
3 weighing compartment
4 balance housing
5 calibration device
6 receiving element
7 calibration weight
8 floor
9 load-carrying surface
10 hook-on portion
11 coupling arrangement
12 passage openings
13 rear wall
14 vertical axis
15 weighing cell
16 grate
17 spill-collector plate
18 code-reader device
19 code
21 holder system
22 coupler bolts
23 column-like projection
26 axis (perpendicular to rear wall)
26' axis (perpendicular to rear wall)
27 lateral support beams
28 glass container
29 draft shield
30 cantilever arm
31 projections
32 bent-over border portions
32' bent-over ears
33 sample-carrier plate
34 dish-shaped attachment
35 laboratory vessel
36 faraday cage
37 shelf
38 laboratory container
49 hook-on adapter
49' holder
49" holder
50 spring
51 disk
52 bracket
53 groove
54 screw
55 narrow-necked containers
64 cutout
65 test tube
66 bottom portion
68 groove
69 semi-circular recess
70 peg
71 peg
79 load-relief system
79' load-relief system
80 motor for load-relief system
81 lamellar elements
82 weighing-load carrier
83 arms
84 container
85 frame
86 bars of weighing-load carrier grate
88 bars of lift platform
89 lift platform
89' lift platform
98 platform of weighing-load carrier
99 weighing container
100 openings
101 clip-on cover
102 insert module
102' insert module
103 sensor housing
104 laser
105 photo diode
106 measuring container
107 magnetic stirrer
108 magnets 109 substance
110 holder

What is claimed is:

1. A balance (1) comprising a weighing compartment (3); a balance housing (4) containing a weighing cell (15) and forming a rear wall (13) and a floor (8) for the weighing compartment (3); a weighing-load carrier (2) arranged on a cantilever arm (30) of the weighing cell (15), said cantilever arm (30) having a weight-receiving element (6) for calibration weights (7) of a calibration device (5); wherein the rear wall (13) has passage openings (12), the cantilever arm (30) has a coupling arrangement (11) extending through the passage openings (12), the weighing-load carrier (2) is releasably attached to the coupling arrangement (11), and the floor (8) extends without openings between the weight-receiving element (6) for the calibration weights (7) and the weighing-load carrier (2).

2. The balance of claim 1, wherein the weighing-load carrier (2) has a center point of an area on which to place weighing objects, the calibration weights (7) have a combined mass center of gravity, and said center point is aligned vertically above said combined mass center of gravity.

3. The balance of claim 1, wherein the weighing-load carrier (2) comprises a level grate (16).

4. The balance of claim 3, wherein the grate (16) has bars of a roof-like triangular profile with a ridge on top.

5. The balance of claim 3, wherein the balance has load-receiving devices (33, 34) for weighing containers and said load-receiving devices are adapted to be attached to the grate (16).

6. The balance of claim 1, wherein the weighing-load carrier (2) comprises a holder (49', 49") for at least one laboratory vessel (55, 65).

7. The balance of claim 6, wherein the holder (49', 49") is adapted so that it can be tilted at different angles.

8. The balance of claim 1, further comprising a spill-collector plate (17) with an uninterrupted surface between the weighing-load carrier (2) and the floor (8).

9. The balance of claim 1, further comprising a built-in holder system (21) arranged at the rear wall (13) of the weighing compartment (3) and adapted for attaching accessory devices at different vertical levels from the floor (8).

10. The balance of claim 9, where in the holder system (21) comprises two parallel vertical grooves (68) running parallel to the rear wall (8).

11. The balance of claim 10, wherein the rear wall (13) comprises a projecting column-like portion (23) with laterally facing flanks a nd the grooves 68 extend in said flanks.

12. The balance of claim 10, wherein the passage openings (12) are arranged substantially in alignment with the grooves (68).

13. The balance of claim 9, wherein the balance (1) is adapted so that a code-reader system (18) can be attached to the holder device (21) at an adjustable height from the floor (8) for reading a code (19) attached to a side-wall-of a weighing container (99).

14. The balance of claim 1, wherein the balance (1) is adapted so that a load-relief system (79, 79') with a lift platform (89, 89') can be attached to the balance housing (4) inside the weighing compartment (3).

15. The balance of claim 14, wherein the load-relief system (79) comprises a grid-shaped lift platform (89) with lamellar grid members (81), the weighing-load carrier (2) comprises a level grate (16), and the lamellar grid members (81) are arranged so that they reach through the grate (16) in such a manner that a weighing object sitting on the grate (16) is lifted up from the latter by the lamellar grid members (81).

16. The balance of claim 14, wherein the weighing-load carrier (82) and the lift platform (89') both comprise level grates with bars and wherein the lift-platform grate bars (88) are arranged to be raised and lowered between the grate bars (86) of the weighing-load carrier (82).

17. The balance of claim 14, further comprising a motor (80) to drive the load-relief system (79, 79').

18. A process of calibrating the balance of claim 14, comprising the steps of a) lifting a weighing container (84) containing a weighing sample off the weighing load carrier (2, 82) by raising the load-relief system (79, 79');

b) setting the calibration weight (7) onto the weight-receiving element (6) of the calibration device (5);

c) calculating and storing new calibration data for the balance (1); and d) setting the weighing container (84) back on the weighing load carrier (2, 82) by lowering the load-relief system (79, 79').

19. The process of claim 18, wherein said process is performed at least once while a long-term weighing experiment is carried out on the balance (1).

20. The balance of claim 1, wherein the balance (1) is adapted so that an insert module (102) can be installed on the floor (8) of the weighing compartment (3), said insert module (102) comprising a code-reader device (18) for reading a code (19) attached to an underside of a weighing container (99).

21. The balance of claim 1, wherein the balance (1) can be equipped with a code-reader device (18) based on an optical code-reader principle for reading a code (19) attached to a weighing container (99).

22. The balance of claim 1, wherein the balance (1) can be equipped with a code-reader device (18) based on an inductive code-reader principle for reading a code (19) attached to a weighing container (99).

23. The balance of claim 1, wherein the balance (1) is adapted so that an insert module (102') can be installed on the floor (8) of the weighing compartment (3), said insert module (102') comprising an apparatus (104, 105) for measuring an amount of turbidity of a weighing sample.

24. The balance of claim 1, wherein the balance (1) is adapted so that a stirring device (107, 108) for stirring a substance in a measuring container (106) can be installed on the floor (8) of the weighing compartment (3).

* * * * *